US011196803B2

(12) United States Patent
Puente Pestaña et al.

(10) Patent No.: US 11,196,803 B2
(45) Date of Patent: Dec. 7, 2021

(54) EDGE CLOUD BROKER AND METHOD THEREIN FOR ALLOCATING EDGE CLOUD RESOURCES

(71) Applicant: Telefonaktiebolaget LM Ericsson (publ), Stockholm (SE)

(72) Inventors: Miguel Angel Puente Pestaña, Madrid (ES); Maria Luisa Mas Rosique, Tres Cantos (ES); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 16/615,960

(22) PCT Filed: May 22, 2017

(86) PCT No.: PCT/EP2017/062271
§ 371 (c)(1),
(2) Date: Nov. 22, 2019

(87) PCT Pub. No.: WO2018/215046
PCT Pub. Date: Nov. 29, 2018

(65) Prior Publication Data
US 2020/0099742 A1 Mar. 26, 2020

(51) Int. Cl.
*H04L 29/08* (2006.01)
*H04W 4/50* (2018.01)
*H04W 4/02* (2018.01)

(52) U.S. Cl.
CPC ...... *H04L 67/1021* (2013.01); *H04L 67/1076* (2013.01); *H04L 67/18* (2013.01); *H04W 4/02* (2013.01); *H04W 4/50* (2018.02)

(58) Field of Classification Search
CPC . H04L 67/1021; H04L 67/18; H04L 67/1076; H04L 29/08; H04W 4/02; H04W 4/50
(Continued)

(56) References Cited

U.S. PATENT DOCUMENTS

2013/0232267 A1* 9/2013 Shatzkamer ...... H04L 29/08765
709/226
2013/0311551 A1* 11/2013 Thibeault ............ H04L 41/0806
709/203
(Continued)

FOREIGN PATENT DOCUMENTS

EP 1 039 721 A2 9/2000
EP 1 039 721 A3 2/2002
(Continued)

OTHER PUBLICATIONS

3GPP TS 23.501 v0.4.0; Technical Specification; 3rd Generation Partnership Project; Technical Specification Group Services and System Aspects; System Architecture for the 5G System; Stage 2 (Release 15)—Apr. 2017.
(Continued)

*Primary Examiner* — Moustafa M Meky
*Assistant Examiner* — Kidest Mendaye
(74) *Attorney, Agent, or Firm* — Baker Botts, LLP

(57) ABSTRACT

The present invention faces the issue of supporting edge cloud in an NG network. There is thus provided an edge cloud broker (ECB) and a method carried out by the ECB for selecting edge cloud resources of a mobile edge computing (MEC) network, the edge cloud resources usable by a UE accessing the NG network. This method comprises: obtaining, from a first network node of the NG network, a UE's location; obtaining, from a second network node of the NG network, an identifier of an edge cloud application that the UE requests; obtaining, from a third network node of the MEC network, a location of each one or more edge cloud resources available to execute the edge cloud application; and selecting, based on at least the UE's location and the location of each one or more edge cloud resources, an
(Continued)

applicable edge cloud resource to execute the edge cloud application for the UE.

22 Claims, 11 Drawing Sheets

(58) Field of Classification Search
USPC .......................................................... 709/226
See application file for complete search history.

(56) References Cited

U.S. PATENT DOCUMENTS

| | | | |
|---|---|---|---|
| 2016/0301598 A1* | 10/2016 | Strijkers | ................. H04L 12/66 |
| 2017/0048876 A1* | 2/2017 | Mahindra | ............. H04M 15/66 |
| 2017/0085628 A1* | 3/2017 | Mahindra | ............... H04L 67/10 |
| 2018/0376445 A1* | 12/2018 | Yoon | ........................ H04W 8/20 |
| 2019/0045409 A1* | 2/2019 | Rasanen | ............... H04W 36/36 |
| 2019/0058767 A1* | 2/2019 | Chandramouli | .. H04W 36/0011 |
| 2019/0253943 A1* | 8/2019 | Zhu | ........................ H04W 76/11 |
| 2019/0342797 A1* | 11/2019 | Fu | ........................ H04L 41/5009 |
| 2020/0068340 A1* | 2/2020 | Rasanen | ............... H04W 60/04 |

FOREIGN PATENT DOCUMENTS

| | | | | |
|---|---|---|---|---|
| WO | WO-2016072895 A1 | * | 5/2016 | ............. H04W 4/24 |
| WO | WO-2017127102 A1 | * | 7/2017 | ............. H04L 67/10 |

OTHER PUBLICATIONS

PCT International Search Report for International application No. PCT/EP2017/062271—dated Aug. 3, 2017.

PCT Written Opinion of the International Searching Authority for International application No. PCT/EP2017/062271—dated Aug. 3, 2017.

* cited by examiner

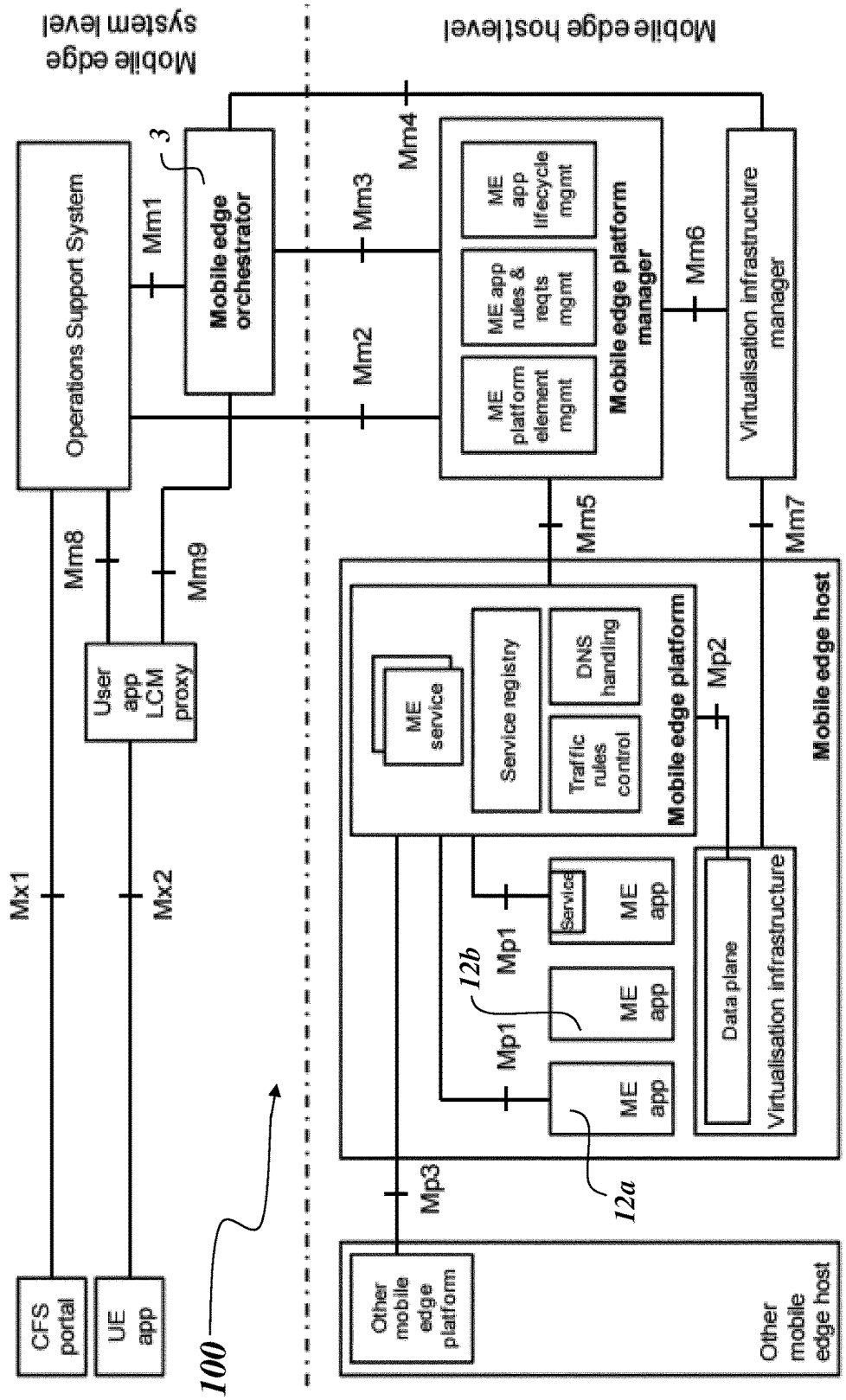
FIG. -1-

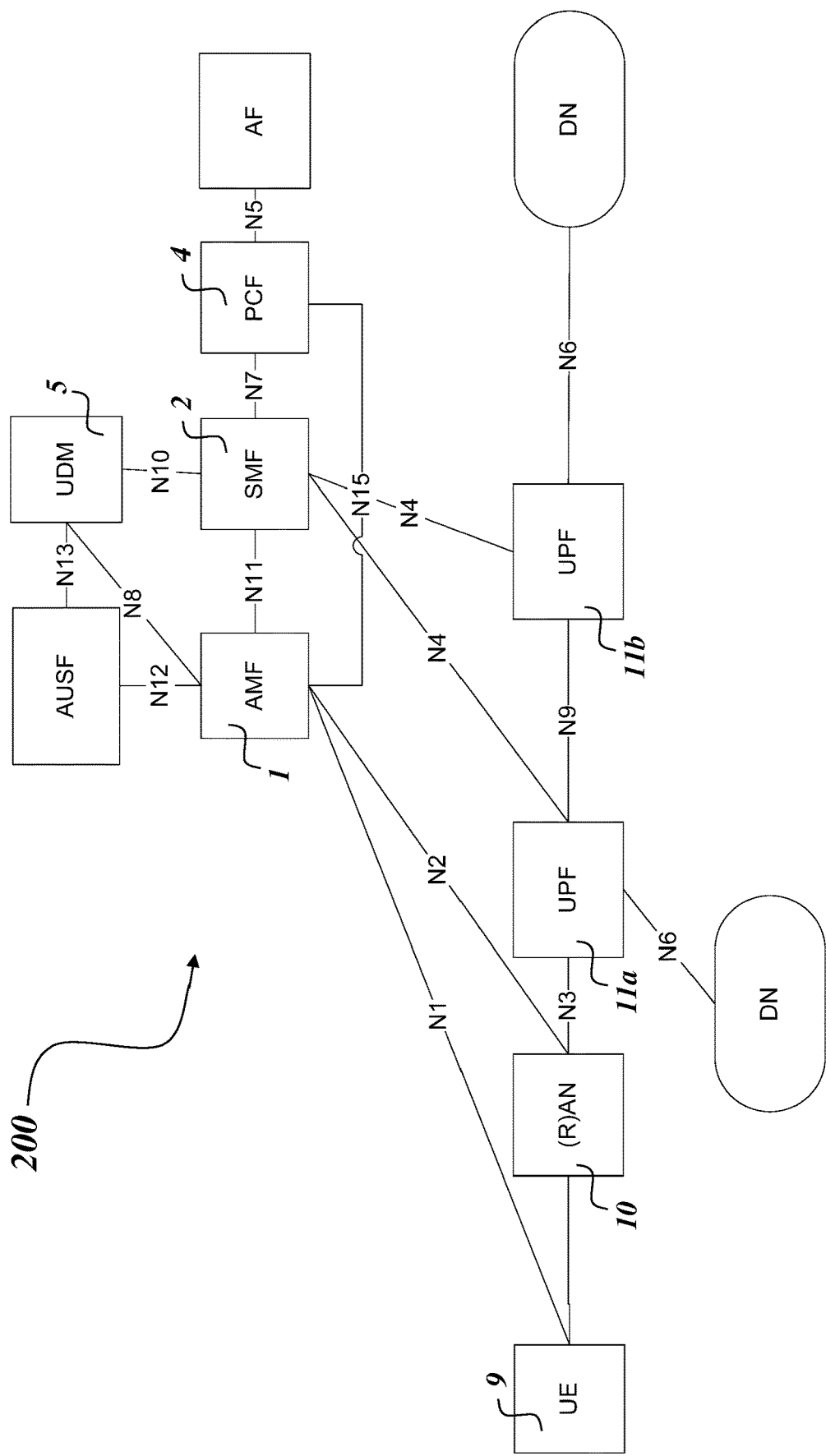
FIG.-2-

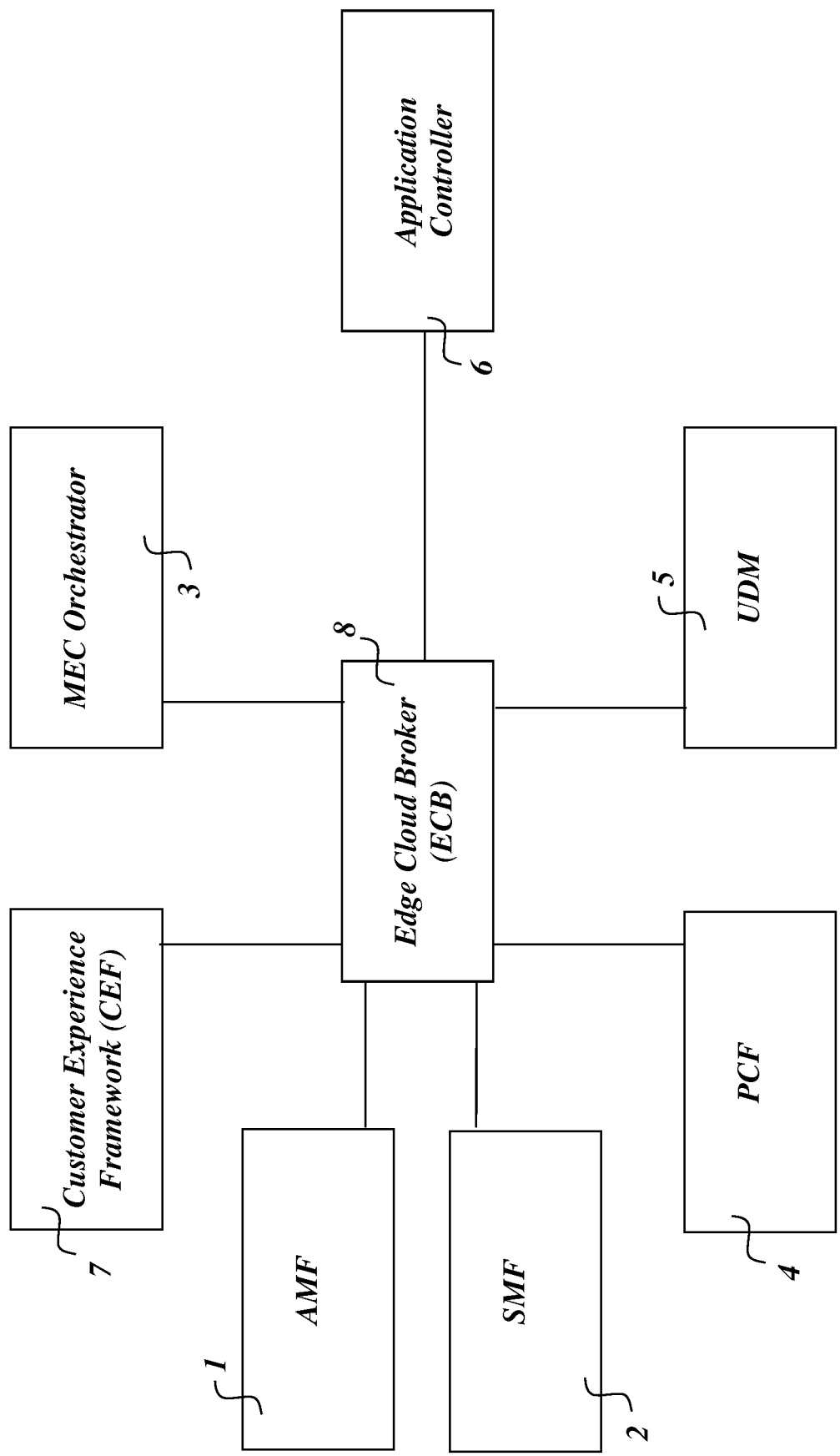
FIG. -3-

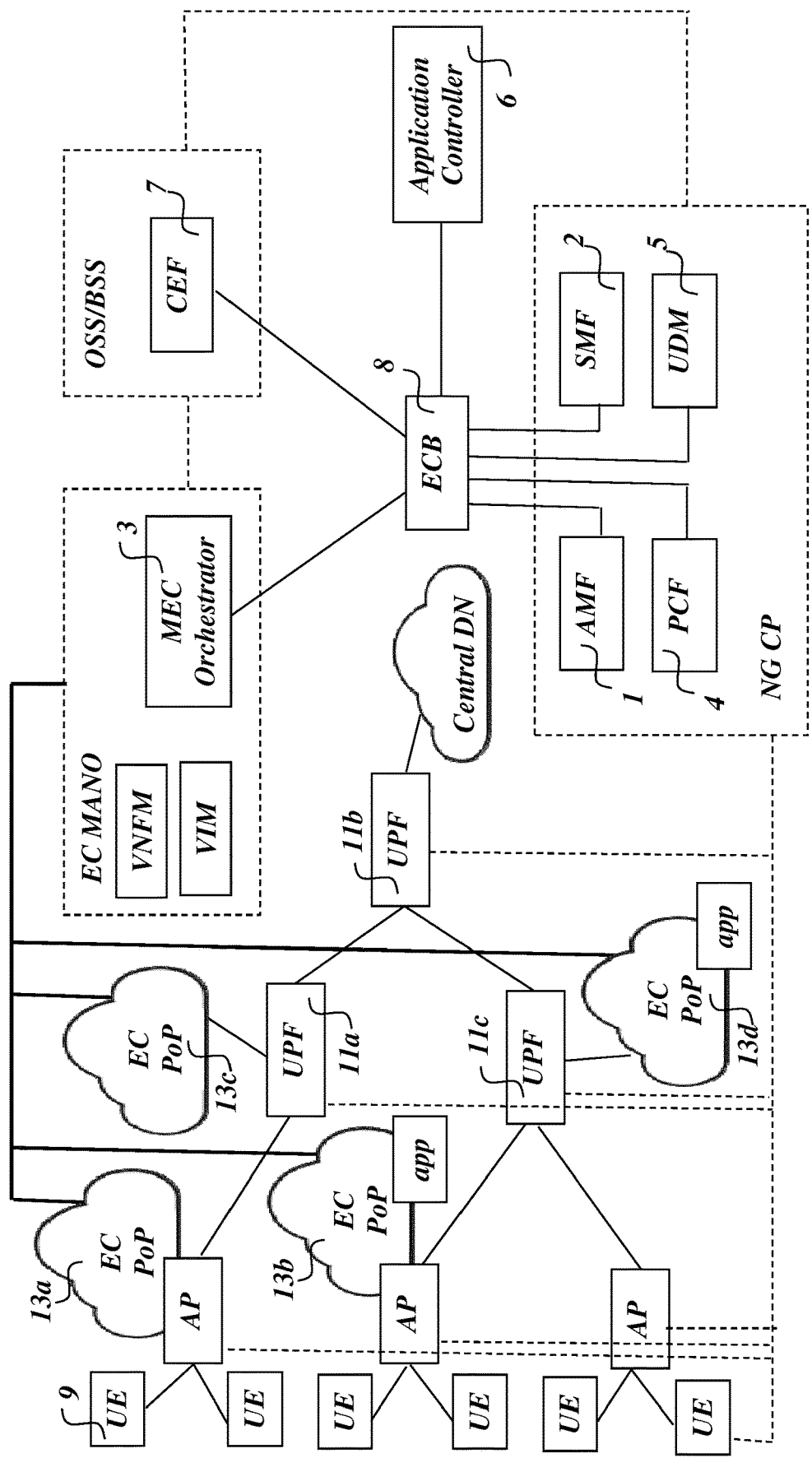
FIG. -4-

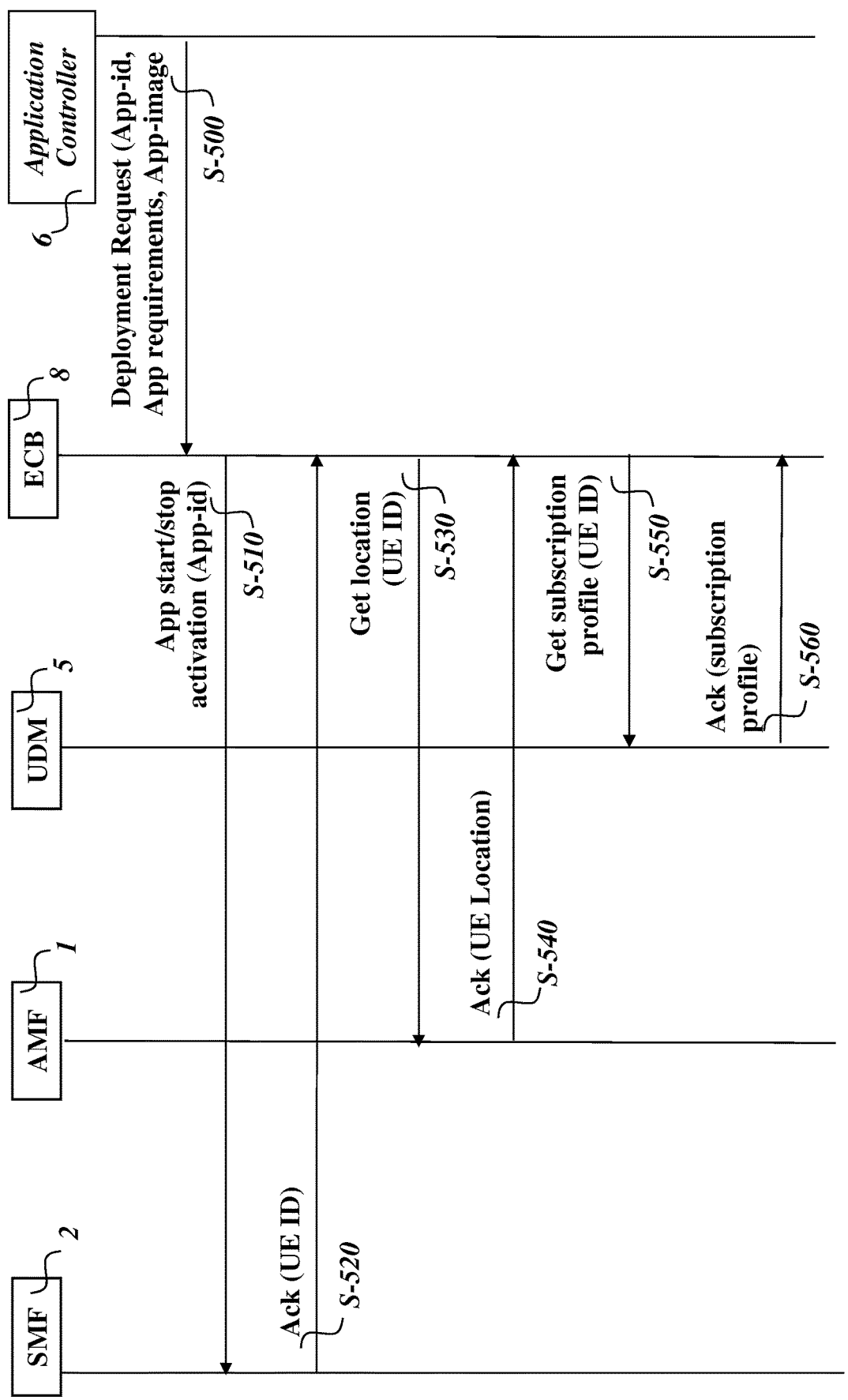
FIG. -5-

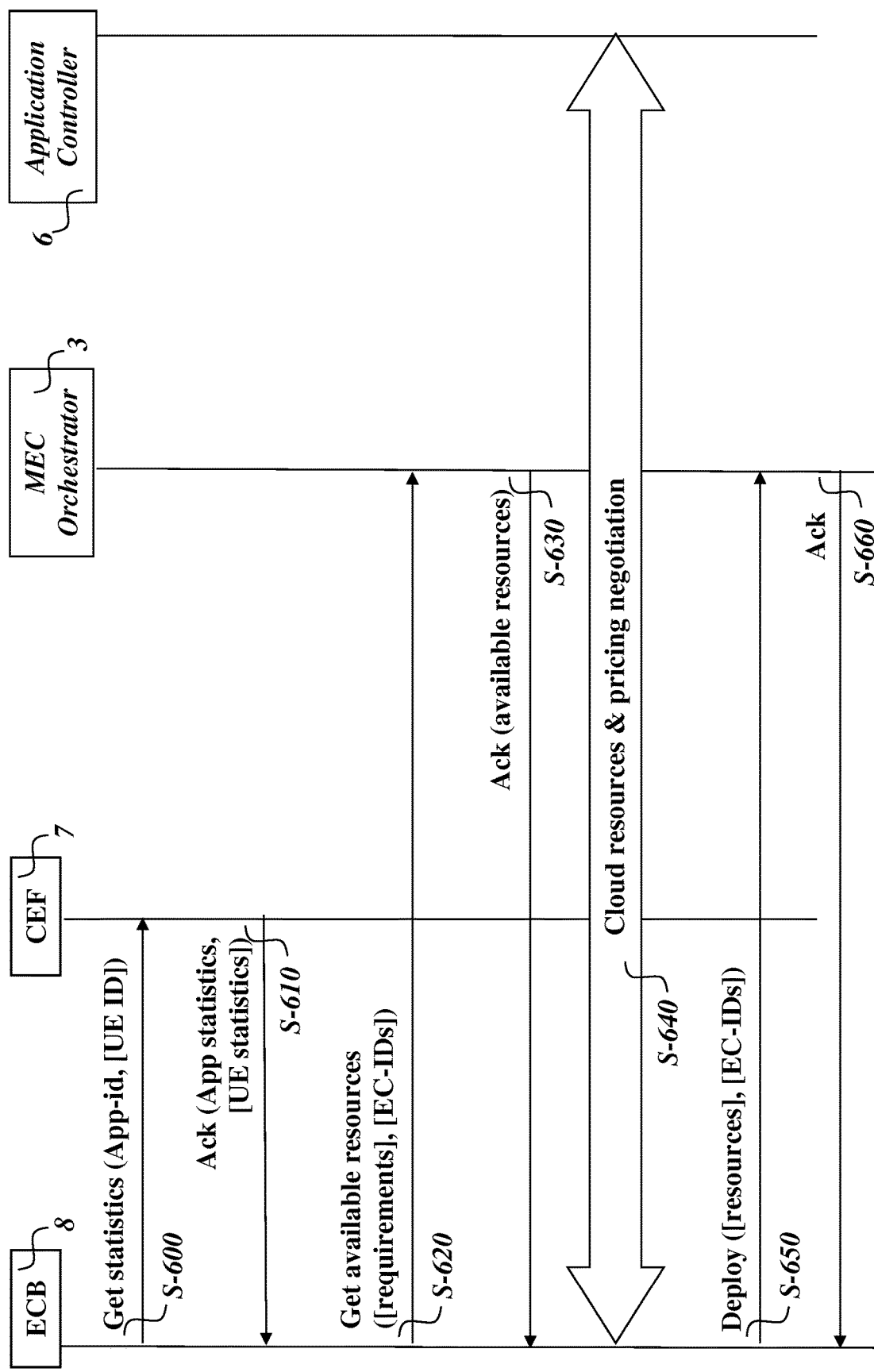
FIG. -6-

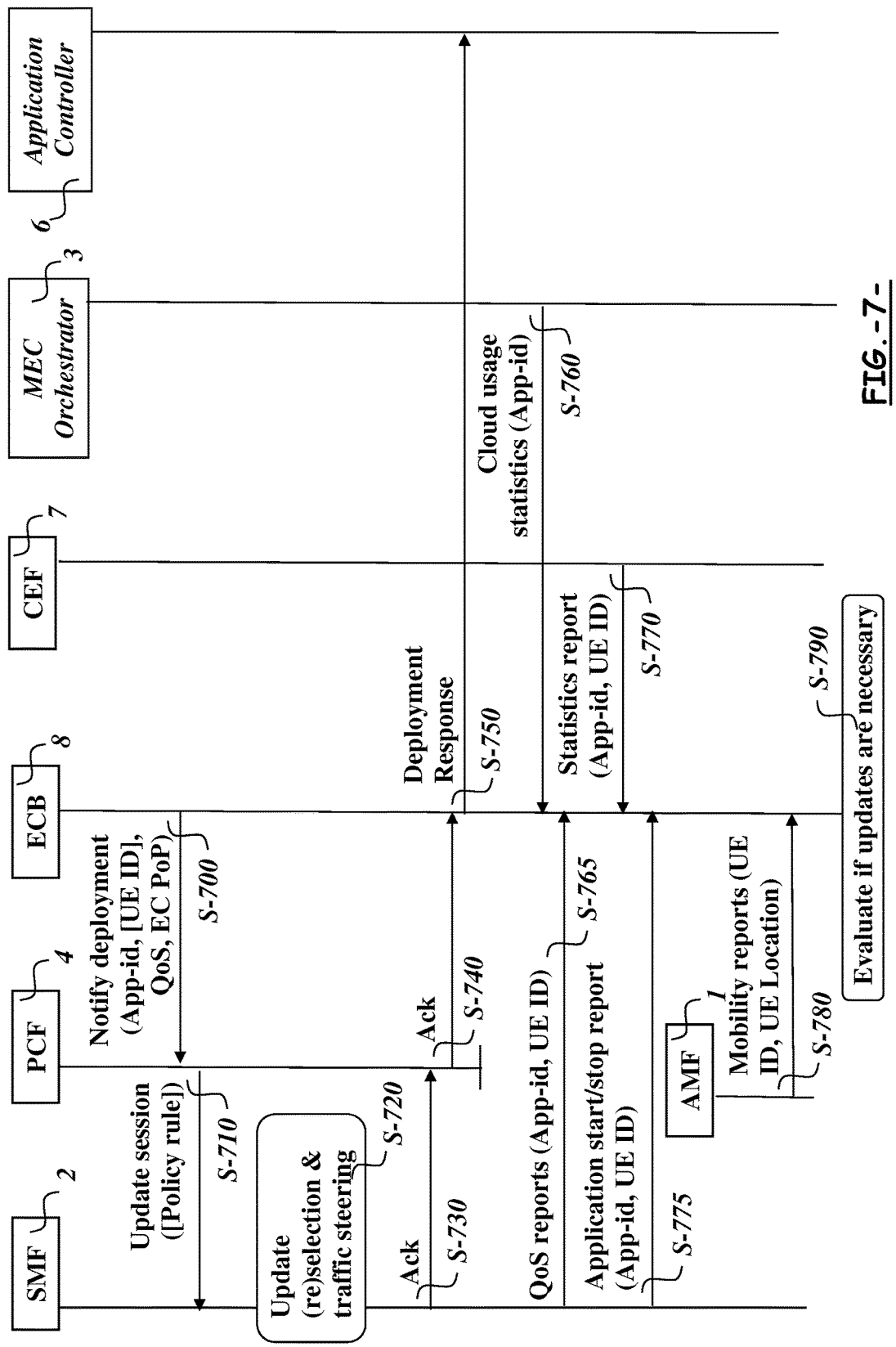
FIG. -7-

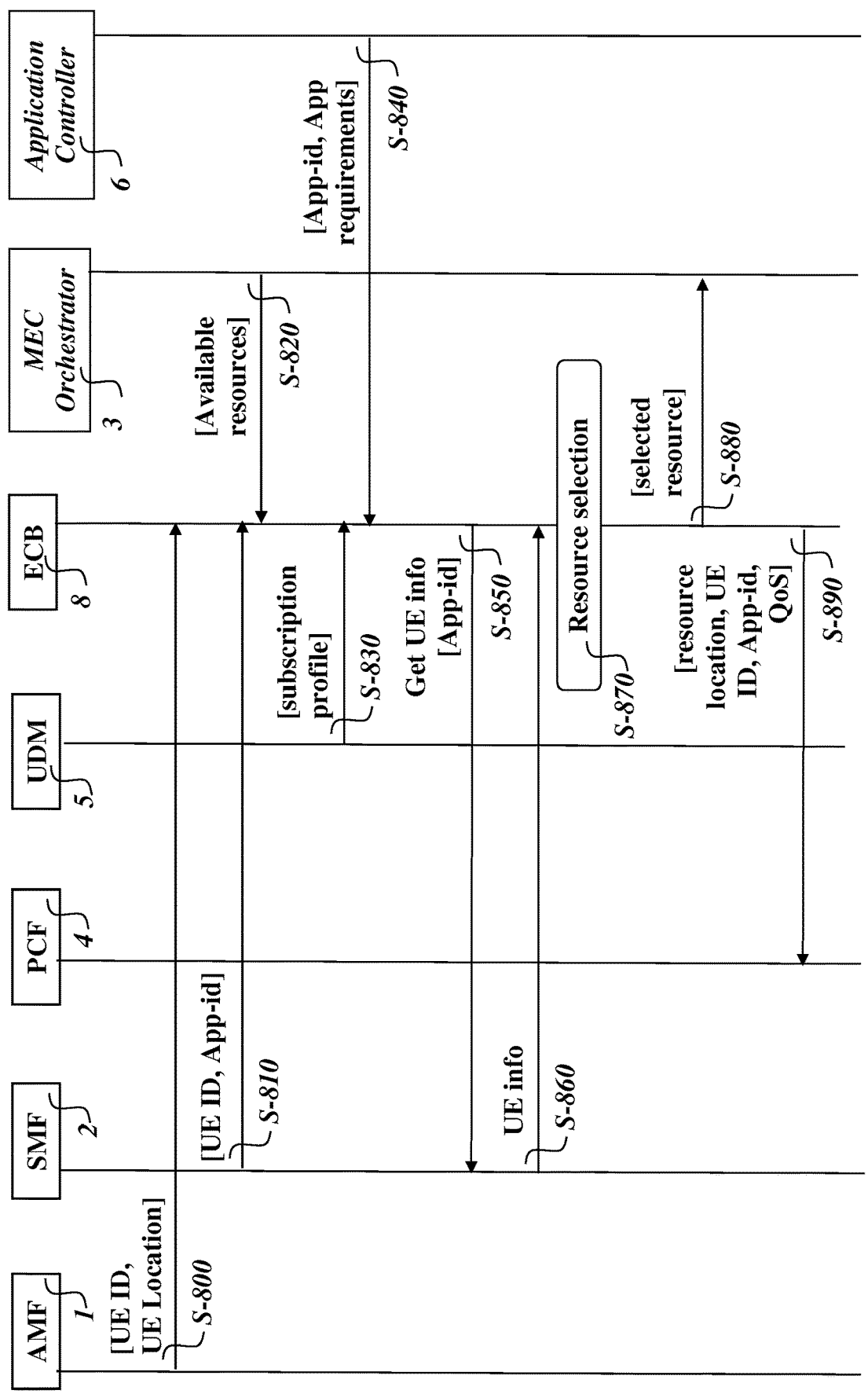
FIG.-8-

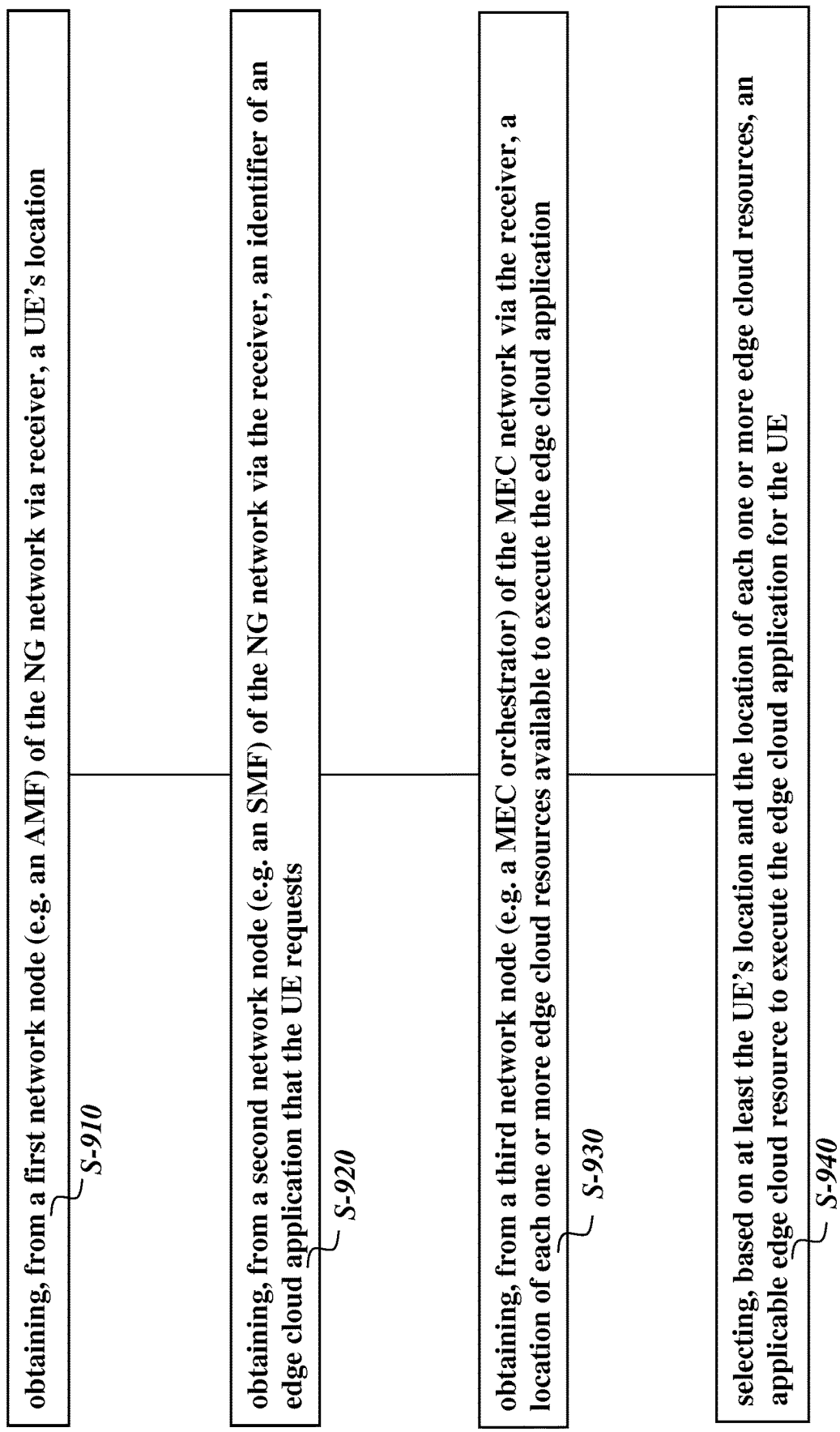
FIG. -9-

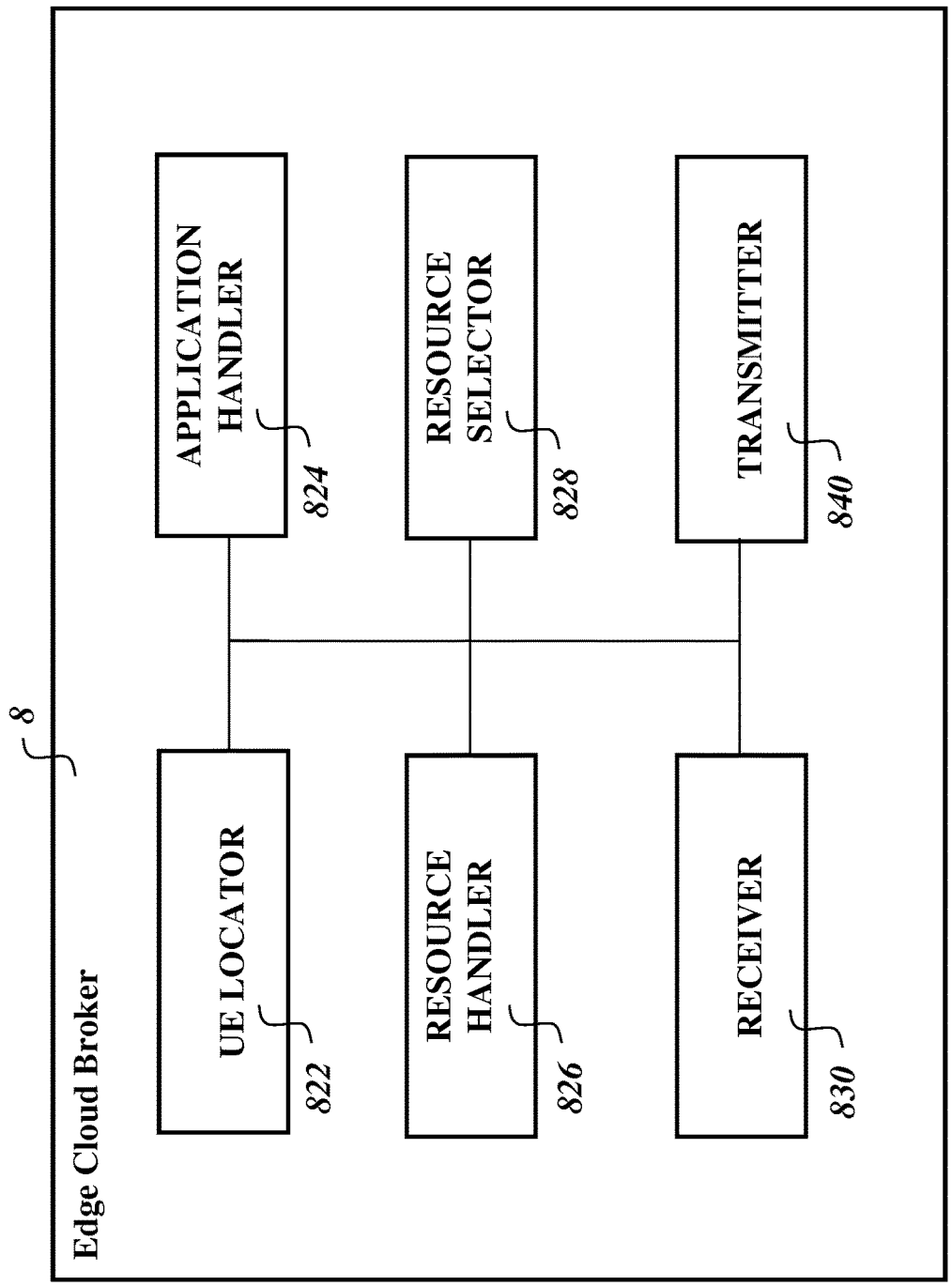
FIG. -10-

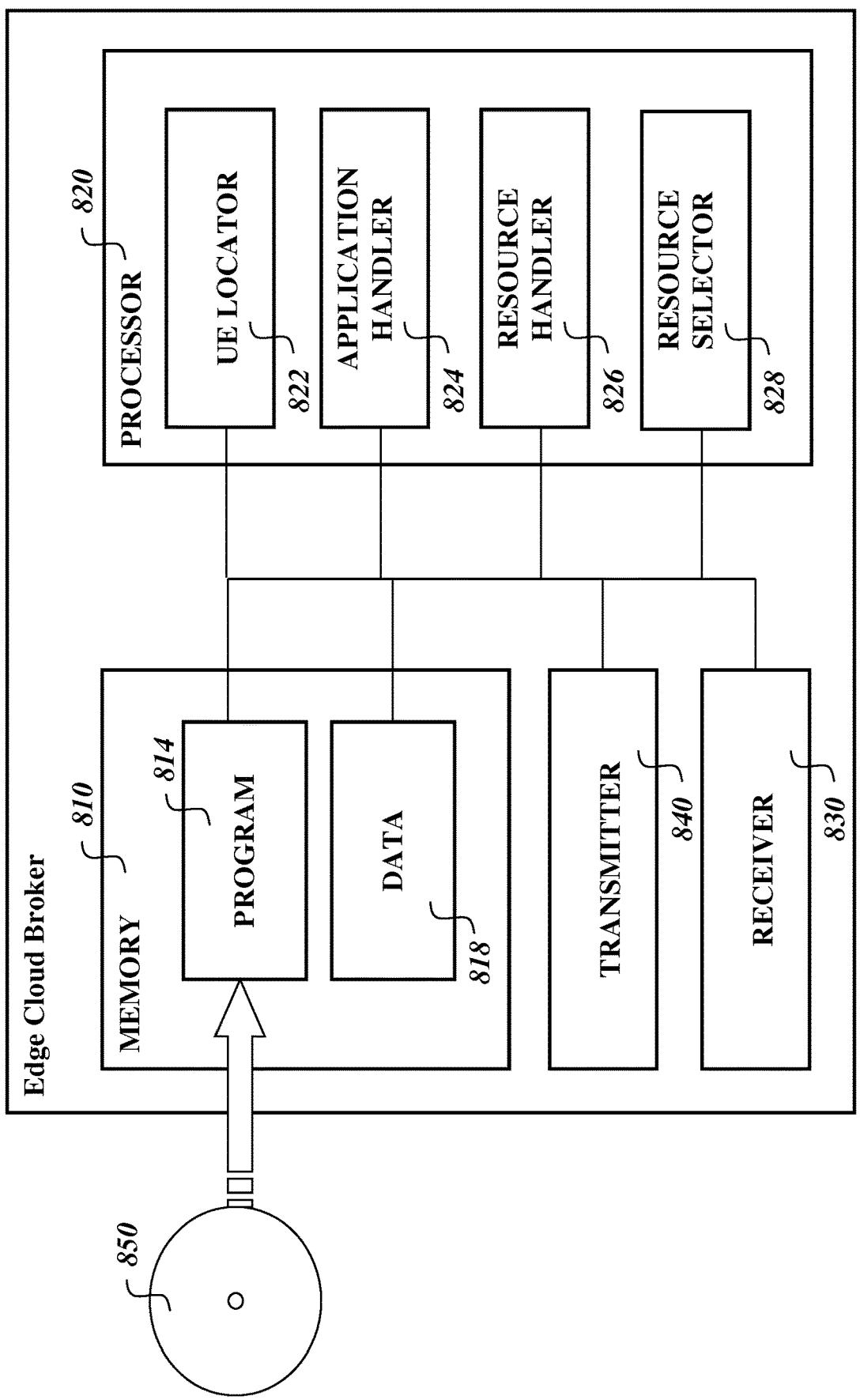
FIG. -11-

EDGE CLOUD BROKER AND METHOD THEREIN FOR ALLOCATING EDGE CLOUD RESOURCES

PRIORITY

This nonprovisional application is a U.S. National Stage Filing under 35 U.S.C. § 371 of International Patent Application Serial No. PCT/EP2017/062271 filed May 22, 2017 and entitled "Edge Cloud Broker and Method Therein for Allocating Edge Cloud Resources" which is hereby incorporated by reference in its entirety.

TECHNICAL FIELD

The present invention generally relates to Edge Computing networks; and, more specifically, the invention relates to introducing Cloud services in an Edge Computing network.

BACKGROUND

Edge Computing (EC) enables operator and 3rd party services to be hosted close to the access point of user equipment (UE) attachment, so as to achieve an efficient service delivery through the reduced end-to-end latency and load on the transport network. In support for EC, the 5G core network selects a user plane function (UPF) close to the UE and executes the traffic steering from the UPF to the local Data Network (DN). This may be based on the UE's subscription data, location, policy or other related traffic rules.

Edge Computing is also referred to as Edge Cloud so that, unless otherwise indicated in the following, EC indistinctly represents Edge Computing and Edge Cloud. 3GPP TS 23.501 V0.4.0 discloses current support for EC in 5G networks.

On the other hand, Mobile Edge Computing (MEC) is a network architecture concept standardized by ETSI that enables cloud computing capabilities and an IT service environment at the edge of the cellular network, e.g. a radio access network (RAN). That is, it allows bringing computing, storage and networking resources closer to the mobile subscribers. MEC applications run in MEC servers located at the network edge. MEC servers can be deployed at multiple locations, such as at e.g. eNodeB, a 3G Radio Network Controller (RNC), etc.

FIG. 1 depicts an ETSI MEC reference architecture, which is based on an ETSI Network Function Virtualization (NFV) architecture. MEC applications run in a virtualized fashion on top of an NFV Infrastructure (NFVI), also referred to as virtualization infrastructure in the MEC architecture.

The MEC architecture comprises a mobile edge host, also known as MEC server, which is an entity containing the virtualization infrastructure and which provides computing, storage, and network resources for the mobile edge applications, and also comprises mobile edge applications that are running as virtual machines (VM) on top of the virtualization infrastructure.

The MEC architecture also comprises virtualization infrastructure manager, which is responsible for resource-level functions such as allocating, managing and releasing virtualized (computing, storage and networking) resources, preparing the virtualization infrastructure to run a software image, collecting and reporting performance and fault information about the virtualized resources, performing application relocation, etc.

The MEC architecture also comprises a mobile edge platform, which may be regarded as a collection of functionalities required to run mobile edge applications on a particular virtualization infrastructure, e.g. MEC server, and a mobile edge platform manager, which interfaces with the mobile edge platform and handles the management of specific functionality of a particular mobile edge host and the applications running on it. It is responsible for the life cycle management of applications including informing a mobile edge orchestrator of relevant application related events.

The MEC architecture also comprises a mobile edge orchestrator, which is responsible for maintaining an overall view of the mobile edge system based on deployed mobile edge hosts, available resources, available mobile edge services, and topology; on-boarding of application packages and preparing the virtualization infrastructure manager(s) to handle the applications; selecting appropriate mobile edge host(s) for application instantiation based on constraints, such as latency, available resources, and available services; and triggering application instantiation, application termination and, when supported, application relocation as needed.

Apart from that, the MEC architecture also comprises a user application lifecycle management proxy, which allows UE applications to request on-boarding, instantiation, termination of MEC applications and, when supported, relocation in and out of the mobile edge system. It also allows informing the UE applications about the state of the user applications.

Also, the MEC architecture comprises a customer facing service (CFS) portal, which allows operators' third-party customers (e.g. commercial enterprises) to select and order a set of mobile edge applications that meet their particular needs, and to receive back service level information from the provisioned applications; and an operations support system (OSS), which receives requests via the CFS portal and from UE applications, for instantiation or termination of applications, and decides on the granting of these requests. Granted requests are forwarded to the mobile edge orchestrator for further processing. When supported, the OSS also receives requests from UE applications for relocating applications between external clouds and the mobile edge system.

Regarding the support for EC in 5G networks introduced above, FIG. 2 depicts a 5G reference architecture. An EC can be considered to be located in the local DN, the one accessed from the UPF connected to the radio access network (RAN). Some of the 5G network elements illustrated in FIG. 2 are discussed in the following.

The UE represents a terminal where a front-end of an EC application runs and is attached via radio channel to a base station. The RAN represents a radio access point. In MEC scenarios, it can host the MEC platform, allowing EC applications to be directly deployed and executed at the base station. The UPF may represent a gateway that routes the traffic toward the EC/MEC platform (Local Break Out) and the central DN. The UPF can be collocated within the base station or as a standalone component.

Apart from these elements, the 5G reference architecture illustrated in FIG. 2 also comprises an access and mobility management function (AMF) entity, which is in charge of UE access and mobility management and which thus knows the UE location; and a session management function (SMF) entity, which is in charge of the session management for the UE communications (i.e. establishing, handling and releasing protocol data unit (PDU) sessions), selecting one or more UPF for the user traffic, and providing to the UPF instructions for routing according to local or external policies.

This 5G reference architecture may also comprise a policy control function (PCF) entity supporting a unified policy framework to govern network behavior, and providing policy rules to other control plane and/or user plane functions, so that these policy rules are enforced, for example charging, quality of service (QoS) and/or traffic steering policies; and a unified data management function (UDM) entity in charge of storing the information of subscriber profiles, the authentication credential repository, etc.

Regarding conventional cloud services models, cloud providers offer cloud resources to cloud consumers, typically through an intermediary entity called cloud broker. Cloud resources can be offered following one of three main service models: Infrastructure as a Service (IaaS), Platform as a Service (PaaS), and Software as a Service (SaaS).

A conventional cloud broker is an entity that manages the use, performance and delivery of cloud services, and negotiates relationships between cloud providers and cloud consumers. A cloud consumer may request cloud services from a cloud broker, instead of contacting a cloud provider directly. The cloud broker can provide services in three categories: aggregation, arbitrage, and intermediation.

At present, whilst costs for network growth are hugely increasing, the operator revenues (per user and gigabyte) are decreasing. The Mobile Edge Computing offers a powerful value for mobile operator's business. The MEC platform enables mobile operators to differentiate their service, improve quality of experience (QoE), expand into new markets and generate revenues.

Apart from that, given the current penetration of cloud services, the inventors have recognized the needs for incorporating support for cloud services in 5G networks along with the EC/MEC platform. As commented above, supporting the cloud services advantageously requires incorporating a cloud broker.

However, currently existing cloud brokering solutions only apply to a central cloud, i.e. they focus on providing cloud services in centralized data centers. In other words, traditional cloud brokers are intended to manage centralized cloud infrastructures (data centers) without taking into account the network's topology.

Therefore, traditional cloud brokers cannot be used for an Edge Cloud, which involves highly distributed cloud infrastructure along the network edge.

SUMMARY

The present invention is aimed to at least minimize the above drawbacks and provides for a new method for selecting edge cloud resources of a mobile edge computing, MEC, network, the edge cloud resources being usable by a user equipment, UE, accessing a next generation, NG, network, and for an edge cloud broker, ECB, node carrying out this method.

In accordance with a first aspect of the present invention, there is provided an ECB node for selecting edge cloud resources of a MEC network, the edge cloud resources being applicable to a UE accessing an NG network.

This ECB node is operable to: obtain, from a first network node of the NG network via a receiver, a UE's location; obtain, from a second network node of the NG network via the receiver, an identifier of an edge cloud application that the UE requests; obtain, from a third network node of the MEC network via the receiver, a location of each one or more edge cloud resources available to execute the edge cloud application; and select, based on at least the UE's location and the location of each one or more edge cloud resources, an applicable edge cloud resource to execute the edge cloud application for the UE.

In order to better handling the execution of the edge cloud application, this ECB node may further be operable to notify, a fourth network node of the NG network via a transmitter, of the applicable edge cloud resource for the fourth network node to apply policies for execution of the edge cloud application. This notification may comprise anyone of an identifier of the edge cloud application, a UE identifier, quality of service requirements, and the location of the applicable edge cloud resource.

For the sake of better selecting the applicable edge cloud resource, the ECB node may further be operable to: obtain, from a fifth network node of the NG network via the receiver, a subscription profile for the UE; and select the applicable edge cloud resource to execute the edge cloud application for the UE also based on the subscription profile for the UE.

Also the sake of better selecting the applicable edge cloud resource, the ECB node may further be operable to: obtain, from a sixth network node of an application provider domain via the receiver, requirements for the edge cloud application to be executed; obtain, from the second network node of the NG network via the receiver, information relating to UEs that are executing the edge cloud application in the NG network; and select the applicable edge cloud resource to execute the edge cloud application also based on the requirements for the edge cloud application to be executed and the information relating to the UEs that are executing the edge cloud application in the NG network.

In order to allocate the selection made, the ECB node may further be operable to notify, the third network node of the MEC network via a transmitter, of the applicable edge cloud resource to execute the edge cloud application for the UE.

In embodiments throughout this specification, the first network node may be a node implementing an access and mobility management function, AMF, of the NG network; the second network node may be a node implementing a session management function, SMF, of the NG network; the third network node may be a node implementing a MEC orchestrator of the MEC network; the fourth network node may be a node implementing a policy control function, PCF, of the NG network; the fifth network node may be a node implementing a unified data management function, UDM, of the NG network; and the sixth network node may be a node implementing an Application controller of an application provider domain.

In an embodiment of the ECB node, the location of an edge cloud resource may identify an edge cloud point of presence, EC PoP.

In accordance with a second aspect of the present invention, there is provided a new method for selecting edge cloud resources of a mobile edge computing, MEC, network, the edge cloud resources being usable by a user equipment, UE, accessing a next generation, NG, network, the method carried out at an edge cloud broker, ECB, node.

This method comprises: obtaining, from a first network node of the NG network via a receiver, a UE's location; obtaining, from a second network node of the NG network via the receiver, an identifier of an edge cloud application that the UE requests; obtaining, from a third network node of the MEC network via the receiver, a location of each one or more edge cloud resources available to execute the edge cloud application; and selecting, based on at least the UE's location and the location of each one or more edge cloud resources, an applicable edge cloud resource to execute the edge cloud application for the UE.

In order to better handling the execution of the edge cloud application, this method may further comprise notifying, a fourth network node of the NG network via a transmitter, of the applicable edge cloud resource for the fourth network node to apply policies for execution of the edge cloud application. In this case, notifying of the applicable edge cloud resource may comprise notifying anyone of an identifier of the edge cloud application, a UE identifier, quality of service requirements, and the location of the applicable edge cloud resource.

For the sake of better selecting the applicable edge cloud resource, this method may further comprise: obtaining, from a fifth network node of the NG network via the receiver, a subscription profile for the UE; and selecting the applicable edge cloud resource to execute the edge cloud application for the UE also based on the subscription profile for the UE.

Also the sake of better selecting the applicable edge cloud resource, this method may further comprise: obtaining, from a sixth network node of an application provider domain via the receiver, requirements for the edge cloud application to be executed; obtaining, from the second network node of the NG network via the receiver, information relating to UEs that are executing the edge cloud application in the NG network; and selecting the applicable edge cloud resource to execute the edge cloud application also based on the requirements for the edge cloud application to be executed and the information relating to the UEs that are executing the edge cloud application in the NG network.

In order to allocate the selection made, this method may further comprise notifying, the third network node of the MEC network via transmitter, of the applicable edge cloud resource to execute the edge cloud application for the UE.

As for the ECB node and in embodiments throughout this specification, the first network node may be a node implementing an access and mobility management function, AMF, of the NG network; the second network node may be a node implementing a session management function, SMF, of the NG network; the third network node may be a node implementing a MEC orchestrator of the MEC network; the fourth network node may be a node implementing a policy control function, PCF, of the NG network; the fifth network node may be a node implementing a unified data management function, UDM, of the NG network; and the sixth network node may be a node implementing an Application controller of an application provider domain.

In an embodiment of this method, the location of an edge cloud resource may identify an edge cloud point of presence, EC PoP.

In accordance with a third aspect of the present invention, there is provided a computer program, comprising instructions which, when executed on at least one processor, cause the at least one processor to carry out the method discussed above. There is also provided a computer program product comprising said computer program.

BRIEF DESCRIPTION OF THE DRAWINGS

The features, objects and advantages of the invention will become apparent by reading this description in conjunction with the accompanying drawings, in which:

FIG. 1 illustrates a MEC reference architecture.
FIG. 2 illustrates a 5G reference architecture.
FIG. 3 illustrates exemplary interfaces between an ECB and entities of the MEC and 5G architectures, in accordance with embodiments disclosed in the present specification.
FIG. 4 illustrates a scenario to support edge cloud in a 5G network, in accordance with an embodiment.
FIG. 5 and FIG. 6 illustrate exemplary sequences of actions carried out by the ECB and entities of the MEC and 5G architectures in selecting edge cloud resources for a UE accessing a 5G network, in accordance with an embodiment.
FIG. 7 illustrates exemplary sequences of actions carried out by the ECB and entities of the MEC and 5G architectures in notifying deployment of an edge cloud resource and further operations that might lead to updating the previous deployment, in accordance with an embodiment.
FIG. 8 illustrates exemplary sequences of actions carried out by the ECB and entities of the MEC and 5G architectures in selecting edge cloud resources for a UE accessing a 5G network, in accordance with another embodiment.
FIG. 9 illustrates an exemplary method carried out by the ECB for selecting edge cloud resources of a MEC network, the edge cloud resources usable by a UE, which accesses a 5G network, in accordance with an embodiment.
FIG. 10 shows a basic component structure of an Edge Cloud Broker in accordance with an embodiment.
FIG. 11 shows a basic component structure of an Edge Cloud Broker in accordance with another embodiment.

DETAILED DESCRIPTION

The following describes embodiments of apparatus and method for selecting edge cloud resources of a MEC network, the edge cloud resources usable by a UE accessing a next generation (NG) network, e.g. 5G network.

FIG. 1 illustrates an exemplary and basic MEC network 100, which includes a mobile edge orchestrator 3. For the sake of simplicity, this mobile edge orchestrator may further be referred to as MEC orchestrator, or simply as orchestrator, and thus all three terms sharing the same numeral reference 3 throughout this specification. This MEC orchestrator participates in embodiments of the method for selecting edge cloud resources of a MEC network for a UE accessing an NG network.

The edge cloud resources of the MEC network 100 may be, for example, mobile edge applications (ME app) 12a-12b running as virtual machines (VM) on top of the virtualization infrastructure shown in FIG. 1.

FIG. 2 illustrates a 5G network where a UE 9 accesses. This 5G network may comprise a RAN 10, UPFs 11a and 11b, an AMF 1, an SMF 2, a PCF 4, a UDM 5, and other 5G entities not directly involved in the method discussed herein for selecting edge cloud resources of a MEC network for a UE 9 accessing the 5G network 200.

Generally speaking throughout this specification, a network node or an entity implementing any particular function of the MEC network or the 5G network, is simply referred to as the particular function.

That is, for the sake of simplicity, a network node implementing a UPF is referred to as the UPF 11a or 11b, a network node implementing an AMF is referred to as the AMF 1, a network node implementing an SMF is referred to as the SMF 2, a network node implementing a PCF is referred to as the PCF 4, a network node implementing a UDM is referred to as the UDM 5, a network node implementing a MEC orchestrator is referred to as the MEC orchestrator 3; and the like for other entities or network nodes. Likewise, an ECB node may be hereinafter simply referred to as the ECB 8.

An embodiment of this method for selecting edge cloud resources 12a and/or 12b of a MEC network 100 is illustrated in FIG. 9, wherein the edge cloud resources are usable by a UE 9 accessing an NG network, e.g. the 5G network 200.

As shown in FIG. 9, this method comprises a step S-910 of obtaining, from a first network node 1 of the NG network via receiver 830, a UE's location; a step S-920 of obtaining, from a second network node 2 of the NG network via the receiver 830, an identifier of an edge cloud application that the UE requests; and a step S-930 of obtaining, from a third network node 3 of the MEC network via the receiver 830, a location of each one or more edge cloud resources available to execute the edge cloud application.

This method also comprises a step S-940 of selecting, based on at least the UE's location and the location of each one or more edge cloud resources, an applicable edge cloud resource to execute the edge cloud application for the UE.

An embodiment of this method for selecting edge cloud resources of a MEC network 100 is illustrated in FIG. 8, wherein the edge cloud resources are usable by a UE, which has accessed a 5G network 200.

As illustrated in FIG. 8, the ECB 8 receives, during step S-800, UE's location information from the AMF 1; the ECB 8 receives from the SMF 2, during step S-810, an identifier of an edge cloud application that the UE requests, e.g. an App-id; and the ECB 8 receives, during step S-820, information regarding available edge cloud resources from the MEC orchestrator 3.

Then, the ECB 8 may also receive, during a step S-830, UE subscription information (e.g. a subscription profile) from the UDM 5 and, during a step S-840, application requirements for the edge cloud application from an application controller 6.

In this respect, the application requirements may include an initial request only for delay requirements for the users of the edge cloud application. The application requirements may also include CPU/memory/disk/network requirements for application instances, in order to allow estimation of the needed edge cloud resources. The requirements for each application instance may depend on the number of concurrent application instance users.

Back to FIG. 8, during steps S-850 and S-860, the ECB 8 may query the SMF 2 for information about the UEs currently using the edge cloud application. Then, based on the obtained information, the ECB 8 selects, during step S-870, the edge cloud resource to execute the edge cloud application.

The selected edge cloud resource may be communicated from the ECB 8 to the MEC orchestrator 3, during step S-880, and the ECB 8 may also communicate to the PCF 4, during step S-890, any one of the edge cloud resource's location, UE ID, App-id, QoS requirements, etc. so that the PCF 4 can apply policies to the edge cloud application traffic.

Further embodiments of this method for selecting edge cloud resources of a MEC network 100 are discussed in the following with reference to FIG. 5 and FIG. 6, wherein the edge cloud resources are usable by a UE, which has accessed a 5G network 200. These further embodiments, or particular aspects thereof, can be combined with anyone of the embodiments discussed above with reference to FIG. 8 and FIG. 9.

As shown in FIG. 5, the application controller 6 transmits, during step S-500, a deployment request to the ECB 8, this request including the App-id, the application requirements and a reference to the application image to be deployed.

As commented above, the application requirements may include an initial request only for delay requirements for the users of the edge cloud application. The application requirements may also include CPU/memory/disk/network requirements for application instances, in order to allow estimation of the needed edge cloud resources. The requirements for each application instance may depend on the number of concurrent application instance users.

The ECB 8 obtains from the SMF 2, during steps S-510 and S-520, information about one or more UEs in the system that are executing that application. Then, during steps S-530 and S-540, the ECB 8 obtains from the AMF 1 a UE location for each of the one or more UEs in the system and, during steps S-550 and S-560, the ECB 8 obtains from the UDM 5 a subscriber profile for each of the one or more UEs.

As shown in FIG. 6, during steps S-600 and S-610, the ECB 8 gets from a Customer Experience Framework (CEF) 7 statistics related to the application and the UEs, so that the ECB 8 can have further information to take the brokering decisions.

During steps S-620 and S-630, the ECB 8 obtains from the MEC orchestrator 3 the available edge cloud resources associated with the UE locations, for example, the edge cloud resources closer to the UE locations. In particular, the ECB may know in advance which edge cloud point of presence (EC PoP) may be accessed from a certain UE location. This information may be provided to the ECB 8 from the AMF 1, the SMF 2 or by configuration.

Based on the information obtained by the ECB 8 between steps S-510 and S-610, the ECB may negotiate with the application controller 6, during step S-640, the edge cloud resources to allocate, as well as pricing and charging details.

Eventually, during steps S-650 and S-660, the ECB 8 may request the MEC orchestrator 3 to deploy, e.g. instantiate, the agreed edge cloud resources in specific Edge Clouds.

As already introduced above, FIG. 7 illustrates an embodiment of actions carried out by the ECB to notify of deployment of an edge cloud resource, as well as embodiments of further operations that might lead to updating the previous deployment.

As FIG. 7 illustrates, the ECB 8 may notify the PCF 4, during step S-700, of the deployment, indicating the App-id, UE ID, QoS requirements, and an indication of the EC PoP. The EC PoP may be indicated to allow the proper traffic steering towards the edge cloud application.

During step S-710, the PCF 4 may trigger activation or installation of corresponding 5G control rules toward the SMF 2, and the SMF 2 may trigger a UPF selection/reselection mechanism, during step S-720, to route and steer the traffic accordingly. In particular, the ECB 8 may send to the SMF 2 also indications on how to identify the traffic.

Upon acknowledges by the entities involved, during steps S-730 and S-740, the ECB 8 may notify the application controller 6, during step S-750, of the deployment completion.

Later on, while running the edge cloud application, the ECB 8 may receive—in any order—any one of cloud usage statistics or reports from the MEC orchestrator 3 and likely per edge cloud application, during step S-760; mobility and/or KPI statistics from the CEF 7 likely per edge cloud application and per UE, during step S-770; QoS and application start/stop reports from the SMF 2 likely per edge cloud application and per UE, during steps S-765 and S-775; and mobility events report from the AMF 1, indicating any new UE's location likely per UE and UE location, during step S-780.

Upon receipt of these information reports, the ECB 8 evaluates if updates are necessary, during step S-790. In particular, the ECB may evaluate whether to trigger any the following actions: charging actions toward the application controller 6, like e.g. a renegotiation process for new pricing agreements; and updating the deployment of an edge cloud application, which might include release of edge cloud resources. In this respect, if updating the deployment takes place, the ECB 8 may also notify the PCF 4 and the SMF 2, as in steps S-700 to S-720 discussed above. Then, the ECB 8 may also notify the application controller 6 of the deployment update (not illustrated in any drawing).

The ECB 8, as discussed throughout this specification, may be arranged to support interfaces with a number of entities of the MEC network 100 and an NG network, like the 5G network 200.

As FIG. 3 illustrates, the ECB 8 may interwork with the AMF 1 to obtain a UE location, which is known by the AMF 1. This UE location may be a e.g. tuple comprising a UE ID and an Access Point ID.

As FIG. 3 illustrates, the ECB 8 may interwork with the SMF 2. On the one hand, since the SMF knows the tuple (App-id, UE ID), the SMF may transmit this tuple to the ECB so that the ECB can know that a certain UE is demanding a certain edge cloud application. The SMF 2 may also transmit to the ECB QoS-related reports.

On the other hand, the ECB 8 may query the SMF 2 to get info regarding edge cloud applications that a UE is executing and/or UEs that are executing a certain edge cloud application. The ECB 8 may indicate to the SMF 2 when a certain edge cloud application is available at a certain EC PoP, so that the SMF 2 can steer the traffic appropriately. Alternatively, this can be done acting on the policy rules applicable at the SMF via PCF 4. The ECB 8 may also notify the SMF 2 of the deployment for a certain edge cloud application so that the SMF can trigger a UPF re-selection.

As FIG. 3 illustrates, the ECB 8 may interwork with the PCF 4 to notify the PCF of the deployment for a certain edge cloud application so that the PCF can trigger the corresponding actions based on the information received from the ECB and also based on internal PCF policies.

As FIG. 3 illustrates, the ECB 8 may interwork with the UDM 5 to obtain, at the ECB from the UDM, a subscription profile for a certain UE, so that the ECB can handle the edge cloud resources accordingly. For example, allocating more resources or providing better QoS to premium subscribers.

As FIG. 3 illustrates, the ECB 8 may interwork with the MEC orchestrator 3. On the one hand, the MEC orchestrator may communicate to the ECB info regarding the applications. For instance, when a deployment has finished (likely upon request from the ECB), crash events, statistics reporting, etc. So, the EBC can carry out charging features appropriately.

On the other hand, the ECB 8 may query the MEC orchestrator 3 to get info regarding available edge cloud resources, deployments of specific edge cloud application instances in specific EC PoPs, edge cloud application instances in execution and/or EC PoP statistics. In particular, the ECB may be able to identify the EC PoP's location in terms of what Access Points are associated to it.

As FIG. 3 illustrates, the ECB 8 may interwork with the application controller 6. On the one hand, the application controller 6 may transmit to the ECB 8—in any order—anyone of instantiation/deployment requests for edge cloud applications (e.g. by sending the App-id together with instantiation request characteristics), modification requests on edge cloud applications already in execution, and/or termination requests. In particular, both the ECB 8 and the application controller 6 may identify the edge cloud application by using the same App-id.

On the other hand, the ECB 8 may transmit to the application controller 6—in any order—anyone of information regarding the needed edge cloud application instances and their distribution to cope with the edge cloud application requirements (delay, throughput, etc.) for the UEs, information regarding the fulfilment or not of the service level agreement (SLA) for the edge cloud application, renegotiation requests for the edge cloud application. For example, when a UE moves, the deployed instances may not suffice, or some UEs may fall in areas where there is no EC PoPs, so this information is communicated to the application controller 6.

FIG. 4 illustrates an exemplary and basic scenario to support Edge Cloud in a 5G network. The ECB 8 offers edge cloud resources to the application provider. The edge cloud resources are handled by the MEC orchestrator 3, which is the entity in charge of the edge cloud application lifecycle management (deployment, migrations, scaling, termination).

The ECB 8 may take as input anyone of the following parameters and in any order: QoS requirements received from the application controller 6, edge cloud application instance characteristics (CPU, memory, disk, network) received from the application controller, location of UEs currently executing an edge cloud application received from the AMF 1, subscription information received from the UDM 5 for UEs currently executing an edge cloud application, current edge cloud application instances deployment, UE mobility patterns, traffic statistics, QoS reports from the network, and user's quality of experience metrics.

The ECB 8 may also carry out QoS enforcements by triggering edge cloud application lifecycle management actions in collaboration with the MEC orchestrator 3. The traffic QoS enforcements are executed in the mobile network.

Apart from that, the ECB 8 may carry out charging actions towards the application provider, by taking as input anyone of the following parameters and in any order: number of UEs executing an edge cloud application, number of edge cloud application instances needed, edge cloud resources usage (e.g. CPU load, memory, etc.), and UPF resources usage (traffic load, traffic measurements, etc.).

Triggering the charging actions may be done by the PCF 4, but the ECB 8 could manage the charging for edge cloud applications in a centralized fashion, i.e. combining the traditional traffic-related charging by PCF with the edge cloud charging.

Regarding the UE location the ECB 8 may retrieve UE location information from the AMF 1, which handles UE access and mobility and is thus aware of UE location, and from a 5G Gateway Mobile Location Center (GMLC), which is defined in 3GPP Rel.14 for location services and is expected to be available in 5G.

Regarding UE location granularity, it may be enough to know UE location on a per Access Point or sector basis though other possibilities are possible. Knowing the UE position on finer granularity (as provided by 3GPP Rel.14 location services) may also help to take better decisions, e.g. on UPF re-selection.

The AMF 1 is expected to have interfaces to the 5G versions of the (4G) GMLC entity, so the AMF may provide the ECB with finer location granularity, without the need for ECB to contact directly the GMLC entity.

Apart from the UE location, it may also be relevant to identify the most appropriate Edge Cloud location, which may host the MEC server for a target application for that particular UE.

In an alternative, the operator may configure a mapping between EC PoPs, which host MEC servers for each particular edge cloud application to be deployed, and UE location granularity, which can be per tracking area (TA), per RAN Access Point or sector or even higher granularity. This mapping may help to identify the most appropriate UPF entity 11a, 11b or 11c for that particular UE's PDU session.

In another alternative, the ECB 8 may interact with the MEC orchestrator 3 and with the AMF 1 or SMF 2 to dynamically retrieve the most appropriate EC PoP according to current UE location.

The network delay between the different Access Points and the existing EC PoPs might advantageously be known a priori by any of these entities involved in FIG. 4 illustration. This information helps for proper QoS assurance and UPF (re)selection in the SMF 2.

Regarding other edge cloud application aspects, the application provider may interact with the ECB 8 for negotiation of edge cloud capabilities, for example, requesting ultra-low delay requirements. The edge cloud application may provide a binary image to be deployed in an Edge Cloud (e.g. by means of a repository).

In case the edge cloud application is already deployed in an Edge Cloud out of the operator's domain, for example belonging to a certain Local Data Network, then the application provider may ask the operator to redirect traffic to the edge cloud application via PCF 4, as this case just involves traffic steering.

The application-related traffic may be identified by the UPF entity 11a, 11b or 11c, for example, via depth packet inspection (DPI) techniques, upon request from the ECB 8.

To this end, in an alternative, the ECB 8 notifies the PCF 4 of the deployment of a certain edge cloud application. The PCF 4 then triggers corresponding 5G PCC rule for that edge cloud application toward the SMF 2, which activates the event trigger for application start/stop notification.

In another alternative, the ECB 8 notifies the SMF 2 directly of the deployment of a certain edge cloud application. The SMF 2 then indicates to the UPF entity (e.g. 11b) to activate the application start/stop notification (not depicted in any drawing).

Regarding the scenarios that may take place upon the initial request from the application provider to the ECB, a first scenario may arise wherein no operator's subscriber is executing the edge cloud application, e.g. because the edge cloud application is new (or any other reason) and no subscriber has installed such new edge cloud application. In this case, there is no precondition. The operator starts handling the edge cloud application before any of its subscribers have it installed.

A second scenario may arise wherein a number of subscribers are executing the edge cloud application, e.g. the edge cloud application is executed in the central DN, which is not Edge Cloud dependent, or the edge cloud application is executed in an Edge Cloud out of the operator's domain. In this case, there may be preconditions, e.g. application start/stop activation in SMF or UPF. Also in this case, application usage, mobility and/or other statistics may be used for optimizing edge cloud resources allocation. These can be retrieved from the CEF 7.

In this second scenario, users' redirection is usually under operator control, but it may involve some challenges. For example, determining whether all users are redirected or just some of them, determining the category of users to be redirected (e.g. operator premium subscribers) and/or determining whether the edge cloud application can indicate what users or flows are to be redirected.

Participating in the methods discussed above and in support of Edge Cloud, the functionality provided by the ECB 8 has been discussed. This ECB is used for selecting edge cloud resources 12a or 12b of a MEC network 100, the edge cloud resources being applicable to a UE 9 accessing an NG network 200. Particular embodiments for this ECB 8 are respectively discussed in the following with reference to FIG. 10 and FIG. 11.

In accordance with an embodiment illustrated in FIG. 10, the ECB 8 may be operable to obtain via receiver 830, from a first network node (e.g. AMF 1) of the NG network, a UE's location; obtain via the receiver 830, from a second network node (e.g. SMF 2) of the NG network, an identifier of an edge cloud application that the UE requests; and obtain via the receiver 830, from a third network node (e.g. MEC orchestrator 3) of the MEC network, a location 11a-11b of each one or more edge cloud resources 12a-12b available to execute the edge cloud application.

Once these data are obtained, the ECB 8 may further be operable to select, based on at least the UE's location and the location of each one or more edge cloud resources, an applicable edge cloud resource to execute the edge cloud application for the UE 9.

Advantageously, this ECB 8 may further be operable to notify via transmitter 840, a fourth network node (e.g. PCF 4) of the NG network, of the applicable edge cloud resource for the fourth network node to apply policies for execution of the edge cloud application. Where this is the case, this notification may comprise anyone of an identifier of the edge cloud application, a UE identifier, quality of service requirements, and the location of the applicable edge cloud resource.

In particular sub-embodiments, apart from the receiver 830 and the transmitter 840, the ECB 8 may comprise anyone of a UE locator 822 configured to obtain the UE's location, an application handler 824 configured to obtain the identifier of the edge cloud application that the UE requests, a resource handler 826 configured to obtain the location 11a-11b of each one or more edge cloud resources 12a-12b available to execute the edge cloud application, and a resource selector 828 configured to select, based on at least the UE's location and the location of each one or more edge cloud resources, the applicable edge cloud resource to execute the edge cloud application for the UE.

The UE locator 822, the application handler 824, the resource handler 826 and the resource selector 828 may be implemented as combinations of hardware and software in separate modules and communicated with the receiver 830 and the transmitter 840.

In accordance with an embodiment illustrated in FIG. 11, the ECB 8 may comprise at least one processor 820, and at least one memory 810 that stores processor-executable instructions 814. In this ECB, the at least one processor interfaces with the at least one memory to execute the processor-executable instructions, whereby the ECB is operable to perform the actions disclosed in the following.

The ECB 8 is thus operable to obtain via receiver 830, from a first network node (e.g. AMF 1) of the NG network, a UE's location; obtain via the receiver 830, from a second network node (e.g. SMF 2) of the NG network, an identifier of an edge cloud application that the UE requests; and obtain via the receiver 830, from a third network node (e.g. MEC orchestrator 3) of the MEC network, a location 11a-11b of each one or more edge cloud resources 12a-12b available to execute the edge cloud application.

The ECB 8 is also operable to select, based on at least the UE's location and the location of each one or more edge cloud resources, an applicable edge cloud resource to execute the edge cloud application for the UE 9.

As for the embodiment discussed above with reference to FIG. 10, also in this embodiment illustrated in FIG. 11 the ECB 8 may further be configured to notify via transmitter 840, a fourth network node (e.g. PCF 4) of the NG network, of the applicable edge cloud resource for the fourth network node to apply policies for execution of the edge cloud application. Where this is the case, this notification may comprise anyone of an identifier of the edge cloud application, a UE identifier, quality of service requirements, and the location of the applicable edge cloud resource.

In particular sub-embodiments of the ECB 8 illustrated in FIG. 11, a UE locator 822 running in a processor 820 may obtain the UE's location, an application handler 824 running in a processor 820 may obtain the identifier of the edge cloud application that the UE requests, a resource handler 826 running in a processor 820 may obtain the location 11a-11b of each one or more edge cloud resources 12a-12b available to execute the edge cloud application, and a resource selector 828 running in a processor 820 may select, based on at least the UE's location and the location of each one or more edge cloud resources, the applicable edge cloud resource to execute the edge cloud application for the UE.

If required at all, the ECB 8 may be complemented with a data section 818 in memory to store the UE's location, the identifier of the edge cloud application that the UE requests, and the location of each one or more edge cloud resources available to execute the edge cloud application.

The ECB 8 illustrated in FIG. 11 may thus comprise the at least one processor 820 and the at least one memory 810, both in communication with each other, with the UE locator 822, the application handler 824, the resource handler 826, the resource selector 828, the receiver 830 and the transmitter 840, and with other elements or units of the ECB 8. The at least one memory 810 may comprise volatile and/or non-volatile memory. In particular, the at least one memory 810 may have a computer program 814 and data 818 stored therein. The computer program 814 may be loaded in the at least one memory 810 from a computer program product 850, such as any non-transitory computer readable medium, in which the computer program is stored. The data 818 may comprise the UE's location, the identifier of the edge cloud application that the UE requests, and the location of each one or more edge cloud resources available to execute the edge cloud application. The at least one processor 820 may be configured to carry out the functions of the UE locator 822, the application handler 824, the resource handler 826, and the resource selector 828.

Further sub-embodiments for the ECB are discussed in the following, these further sub-embodiments being applicable for both embodiments discussed above with reference to FIG. 10 and FIG. 11.

In a sub-embodiment, the ECB 8 may further be operable to obtain via the receiver 830, from a fifth network node (e.g. UDM 5) of the NG network, a subscription profile for the UE; and select the applicable edge cloud resource to execute the edge cloud application for the UE also based on the subscription profile for the UE.

In another sub-embodiment, the ECB 8 may further be operable to obtain, via the receiver 830, from a sixth network node (e.g. application controller 6) of an application provider domain, requirements for the edge cloud application to be executed; obtain via the receiver 830, from the second network node (e.g. SMF 2) of the NG network, information relating to UEs that are executing the edge cloud application in the NG network; and select the applicable edge cloud resource to execute the edge cloud application also based on the requirements for the edge cloud application to be executed and the information relating to the UEs that are executing the edge cloud application in the NG network.

In a further sub-embodiment, the ECB 8 may further be operable to notify via transmitter 840, the third network node (e.g. MEC orchestrator 3) of the MEC network, of the applicable edge cloud resource to execute the edge cloud application for the UE.

Apart from the UE locator 822, the application handler 824, the resource handler 826, and the resource selector 828, which may be running in a processor 820 for the embodiment illustrated in FIG. 11, or implemented as combinations of hardware and software in separate modules for the embodiment illustrated in FIG. 10, there may be an additional data handler (not illustrated in any drawing) running in a processor 820 and/or implemented as combinations of hardware and software in a separate module; the additional data handler being in charge of handling, for example, the subscription profile for a UE, requirements for the edge cloud application to be executed, information relating to UEs that are executing the edge cloud application in the NG network, and the like.

For the above embodiments and sub-embodiments, the location of an edge cloud resource may identify an EC PoP 13a-13d.

As commented above by way of examples, the first network node may implement an AMF 1 of the NG network, the second network node may implement an SMF 2 of the NG network, the third network node may implement a MEC orchestrator 3 of the MEC network, the fourth network node may implement a PCF 4 of the NG network, the fifth network node may implement a UDM 5 of the NG network, and the sixth network node may implement an Application controller 6 of an application provider domain.

The invention may also be practised by a one or more computer program, each computer program comprising instructions which, when executed on at least one processor, cause the at least one processor to carry out at least one of the methods discussed above.

As used throughout the present specification, the word "comprising" does not exclude the presence of other elements or steps than those listed and the words "a" or "an" preceding an element do not exclude the presence of a plurality of such elements.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. An edge cloud broker, ECB, node for selecting edge cloud resources of a mobile edge computing, MEC, network, applicable to a user equipment, UE, accessing a next generation, NG, network, the ECB node operable to:
obtain, from a first network node of the NG network via receiver, a UE's location;
obtain, from a second network node of the NG network via the receiver, an identifier of an edge cloud application that the UE requests;

obtain, from a third network node of the MEC network via the receiver, a location of each one or more edge cloud resources available to execute the edge cloud application;

obtain, from a fourth network node of an application provider domain via the receiver, requirements for the edge cloud application to be executed, wherein the requirements comprise delay requirements for users of the edge cloud application, the requirements depend on a number of concurrent edge cloud application users;

obtain, from a fifth network node of the NG network via the receiver, a subscription profile for the UE;

select, based on at least the UE's location, the location of each one or more edge cloud resources, the subscription profile for the UE, and the requirements, an applicable edge cloud resource to execute the edge cloud application for the UE; and notify, a sixth network node of the NG network via transmitter, of the applicable edge cloud resource for the fourth network node to apply policies for execution of the edge cloud application.

2. The ECB node of claim 1, wherein the notification comprises anyone of an identifier of the edge cloud application, a UE identifier, quality of service requirements, and the location of the applicable edge cloud resource.

3. The ECB node of claim 1, further operable to:
obtain, from the second network node of the NG network via the receiver, information relating to UEs that are executing the edge cloud application in the NG network; and select the applicable edge cloud resource to execute the edge cloud application also based on the requirements for the edge cloud application to be executed and the information relating to the UEs that are executing the edge cloud application in the NG network.

4. The ECB node of claim 1, further operable to notify, the third network node of the MEC network via transmitter, of the applicable edge cloud resource to execute the edge cloud application for the UE.

5. The ECB node of claim 1, wherein the first network node implements an access and mobility management function, AMF, of the NG network.

6. The ECB node of claim 1, wherein the second network node implements a session management function, SMF, of the NG network.

7. The ECB node of claim 1, wherein the third network node implements a MEC orchestrator of the MEC network.

8. The ECB node of claim 1, wherein the sixth network node implements a policy control function, PCF, of the NG network.

9. The ECB node of claim 1, wherein the fifth network node implements a unified data management function, UDM, of the NG network.

10. The ECB node of claim 1, wherein the fourth network node implements an Application controller of the application provider domain.

11. The ECB node of claim 1, wherein the location of an edge cloud resource identifies an edge cloud point of presence, EC PoP.

12. A method for selecting edge cloud resources of a mobile edge computing, MEC, network, the edge cloud resources being usable by a user equipment, UE, accessing a next generation, NG, network, the method carried out at an edge cloud broker, ECB, node and comprising:
obtaining, from a first network node of the NG network via receiver, a UE's location;

obtaining, from a second network node of the NG network via the receiver, an identifier of an edge cloud application that the UE requests;

obtaining, from a third network node of the MEC network via the receiver, a location of each one or more edge cloud resources available to execute the edge cloud application;

obtaining, from a fourth network node of an application provider domain via the receiver, requirements for the edge cloud application to be executed, wherein the requirements comprise delay requirements for users of the edge cloud application, the requirements depend on a number of concurrent edge cloud application users;

obtaining, from a fifth network node of the NG network via the receiver, a subscription profile for the UE; and selecting, based on at least the UE's location, the location of each one or more edge cloud resources, the subscription profile for the UE, and the requirements, an applicable edge cloud resource to execute the edge cloud application for the UE; and notifying, a sixth network node of the NG network via transmitter, of the applicable edge cloud resource for the fourth network node to apply policies for execution of the edge cloud application.

13. The method of claim 12, wherein notifying of the applicable edge cloud resource comprises notifying anyone of an identifier of the edge cloud application, a UE identifier, quality of service requirements, and the location of the applicable edge cloud resource.

14. The method of claim 12, wherein the method further comprises:
obtaining, from the second network node of the NG network via the receiver, information relating to UEs that are executing the edge cloud application in the NG network; and selecting the applicable edge cloud resource to execute the edge cloud application also based on the requirements for the edge cloud application to be executed and the information relating to the UEs that are executing the edge cloud application in the NG network.

15. The method of claim 12, wherein the method further comprises notifying, the third network node of the MEC network via transmitter, of the applicable edge cloud resource to execute the edge cloud application for the UE.

16. The method of claim 12, wherein the first network node implements an access and mobility management function, AMF, of the NG network.

17. The method of claim 12, wherein the second network node implements a session management function, SMF, of the NG network.

18. The method of claim 12, wherein the third network node implements a MEC orchestrator of the MEC network.

19. The method of claim 12, wherein the sixth network node implements a policy control function, PCF, of the NG network.

20. The method of claim 12, wherein the fifth network node implements a unified data management function, UDM, of the NG network.

21. The method of claim 12, wherein the location of an edge cloud resource identifies an edge cloud point of presence, EC PoP.

22. A computer readable non-transitory storage medium storing a computer program, comprising instructions which, when executed on at least one processor, cause the at least one processor to carry out the method according to claim 12.

* * * * *